United States Patent
Okamoto et al.

(10) Patent No.: US 8,442,018 B2
(45) Date of Patent: May 14, 2013

(54) WIRELESS COMMUNICATION SYSTEM, ROUTER APPARATUS, WIRELESS COMMUNICATION METHOD, AND PROGRAM

(75) Inventors: Tsukasa Okamoto, Shizuoka (JP); Masahiko Yahagi, Tokyo (JP)

(73) Assignees: NEC Corporation, Tokyo (JP); NEC Access Technica, Ltd., Shizuoka (JP)

( * ) Notice: Subject to any disclaimer, the term of this patent is extended or adjusted under 35 U.S.C. 154(b) by 285 days.

(21) Appl. No.: 13/058,086

(22) PCT Filed: Sep. 9, 2009

(86) PCT No.: PCT/JP2009/065721
§ 371 (c)(1),
(2), (4) Date: Feb. 8, 2011

(87) PCT Pub. No.: WO2010/035637
PCT Pub. Date: Apr. 1, 2010

(65) Prior Publication Data
US 2011/0134814 A1  Jun. 9, 2011

(30) Foreign Application Priority Data
Sep. 26, 2008  (JP) .................................. 2008-247874

(51) Int. Cl.
*H04W 4/00* (2009.01)

(52) U.S. Cl.
USPC ............................ 370/338; 370/400; 370/347

(58) Field of Classification Search .................. None
See application file for complete search history.

(56) References Cited

U.S. PATENT DOCUMENTS

| | | | | |
|---|---|---|---|---|
| 7,349,665 B1 * | 3/2008 | Zhu et al. | ..................... | 455/11.1 |
| 2005/0254442 A1* | 11/2005 | Proctor et al. | ................. | 370/294 |
| 2007/0066220 A1* | 3/2007 | Proctor et al. | ................ | 455/11.1 |
| 2007/0076649 A1* | 4/2007 | Lin et al. | ......................... | 370/328 |
| 2007/0268846 A1* | 11/2007 | Proctor et al. | ................. | 370/279 |
| 2008/0123579 A1* | 5/2008 | Kozat et al. | .................... | 370/312 |
| 2010/0172285 A1* | 7/2010 | Tokuyasu et al. | ............. | 370/315 |

FOREIGN PATENT DOCUMENTS

| | | |
|---|---|---|
| JP | 2001069060 A | 3/2001 |
| JP | 2004179975 A | 6/2004 |
| JP | 2005026816 A | 1/2005 |

(Continued)

OTHER PUBLICATIONS

Japanese Office Action for JP2010-530808 mailed on May 15, 2012.

(Continued)

*Primary Examiner* — Bob Phunkulh

(57) ABSTRACT

A wireless communication system includes a first communication apparatus that uses first frequency band to communicate wirelessly by time division method, a second communication apparatus that uses second frequency band adjacent to the first frequency band to communicate wirelessly by time division method, and a router apparatus that relays data communicated wirelessly in the first and second communication apparatus. The router apparatus includes a first communication unit that uses the first frequency band to communicate wirelessly by time division method with the first communication apparatus, a second communication unit that uses the second frequency band to communicate wirelessly by time division method with the second communication apparatus simultaneously with wireless communication by the first communication unit, and a controller that causes transmission intervals and reception intervals in the second communication unit to coincide with transmission intervals and reception intervals that are partitioned by time divisions in the first communication unit.

12 Claims, 2 Drawing Sheets

FOREIGN PATENT DOCUMENTS

| | | |
|---|---|---|
| JP | 2005045330 A | 2/2005 |
| JP | 2008061015 A | 3/2008 |
| JP | 2008079039 A | 4/2008 |
| JP | 2008167149 A | 7/2008 |

OTHER PUBLICATIONS

"A study of interface avoidance in two wireless systems using proximity frequency band", Akira Kishida et al. Institute of Electronics, Information, and Communication Engineers, B-5-123, Sep. 12, 2008 p. 436.

"Improvement of CSMA with RTS/CTS Protocol under Capture effect in Wireless LAN", Takefumi Hiraguri et al, Institute of Electronics, Information, and Communication Engineers, B-5-165, Sep. 7, 2000 p. 453.

International Search Report for PCT/JP2009/065721 mailed Oct. 20, 2009.

* cited by examiner

WIRELESS COMMUNICATION SYSTEM, ROUTER APPARATUS, WIRELESS COMMUNICATION METHOD, AND PROGRAM

The present application is the National Phase of PCT/JP2009/065721, filed Sep. 9, 2009, which claims priority based on Japanese Patent Application No. 2008-247874 for which application was submitted on Sep. 26, 2008 and incorporates all of the disclosures of that application.

TECHNICAL FIELD

The present invention relates to a wireless communication system, a router apparatus, a wireless communication method, and a program.

BACKGROUND ART

Wireless LAN (Local Area Network) communication is now widespread as a wireless communication technology. In a system realized by a wireless LAN, TE (Terminal Equipment), which is a terminal for use in a wireless LAN, is able to connect with a network by way of wireless communication realized by a wireless LAN that is carried out with a wireless LAN access point. Among wireless LAN access points, there are also apparatuses referred to as wireless LAN routers that are equipped with router capabilities.

In recent years, WiMAX (Worldwide Interoperability for Microwave Access) communication is receiving attention as a new wireless communication technology. WiMAX communication offers the advantage of extremely high speed with communication speeds of 20 Mbps and greater even though realized by wireless communication.

As a result, a number of terminals capable of both wireless LAN communication and WiMAX communication have been proposed as terminals for wireless communication (For example, refer to Patent Documents 1 and 2).

According to current trends, it is believed there will be an increasing need in the above-described wireless LAN router for simultaneously carrying out wireless LAN communication and WiMAX communication, i.e., carrying out WiMAX communication with a BS (base station) that is a base station for WiMAX at the same time as carrying out wireless LAN communication with TE.

LITERATURE OF THE PRIOR ART

Patent Documents
  Patent Document 1: JP 2008-079039 A
  Patent Document 2: JP 2008-061015 A

SUMMARY OF THE INVENTION

Problem to be Solved by the Invention

The frequency band of WiMAX is the 2.5-GHz band, which is adjacent to the 2.4-GHz band, the frequency band of wireless LAN.

As a result, when wireless LAN communication and WiMAX communication are simultaneously carried out in a wireless LAN router, the communication waves during communication become mutual interference waves and therefore prevent the maintenance of the communication quality of wireless LAN communication or WiMAX communication.

In particular, when data are transmitted to a BS in WiMAX communication from a wireless LAN router, these transmission waves have maximum power at the point at which they are transmitted from the wireless LAN router and therefore become strong interference waves for the received data of the wireless LAN that are received in the wireless LAN router from a TE and have a large impact on the communication quality of the wireless LAN communication. When data are transmitted from a wireless LAN router to a TE in wireless LAN communication, these transmission waves have highest power at the point at which they are transmitted from the wireless LAN router and therefore become strong interference waves for received data of WiMAX communication that is received in the wireless LAN router from the BS and therefore have a large impact on the communication quality of WiMAX communication.

It is therefore an object of the present invention to provide a wireless communication system, a router apparatus, a wireless communication method, and a program that can maintain the communication quality of wireless LAN communication or WiMAX communication even when wireless LAN communication and WiMAX communication are carried out at the same time in a router apparatus.

Means for Solving the Problem

The wireless communication system of the present invention is a wireless communication system that includes a first communication apparatus that uses a first frequency band to carry out wireless communication by a time division method; a second communication apparatus that uses a second frequency band that is adjacent to the first frequency band to carry out wireless communication by a time division method; and a router apparatus that relays data that are communicated wirelessly in the first communication apparatus and the second communication apparatus; wherein the router apparatus includes:

a first communication unit that uses the first frequency band to carry out wireless communication by a time division method with the first communication apparatus;

a second communication unit that uses the second frequency band to carry out wireless communication by a time division method with the second communication apparatus simultaneously with wireless communication by means of the first communication unit; and a control unit that causes each of the transmission intervals and reception intervals of data in the second communication unit to coincide with each of the transmission intervals and reception intervals of data that have been partitioned into time divisions in the first communication unit:

The router apparatus of the present invention is a router apparatus that relays data that are wirelessly communicated in a first communication apparatus that uses a first frequency band to carry out wireless communication by a time division method and a second communication apparatus that uses a second frequency band that is adjacent to the first frequency band to carry out wireless communication by a time division method; the router apparatus including:

a first communication unit that uses the first frequency band to carry out wireless communication by a time division method with the first communication apparatus;

a second communication unit that uses the second frequency band to carry out wireless communication by a time division method with the second communication apparatus simultaneously with wireless communication by the first communication unit; and a control unit that causes each of the transmission intervals and reception intervals of data in the second communication unit to coincide with each of the transmission intervals and reception intervals of data that have been partitioned by time divisions in the first communication unit.

The wireless communication method of the present invention is a wireless communication method realized by a router apparatus that relays data that are wirelessly communicated in a first communication apparatus that uses a first frequency band to carry out wireless communication by a time division method and a second communication apparatus that uses a second frequency band that is adjacent to the first frequency band to carry out wireless communication by a time division method, the wireless communication method including:

a first communication step of using the first frequency band to carry out wireless communication by a time division method with the first communication apparatus;

a second communication step of using the second frequency band to carry out wireless communication by a time division method with the second communication apparatus simultaneously with the first communication step; and a control step of causing each of the transmission intervals and reception intervals of data in the second communication step to coincide with each of the transmission intervals and reception intervals of data that are partitioned by time divisions in the first communication step.

The program of the present invention causes a router apparatus, which relays data that are wirelessly communicated in a first communication apparatus that uses a first frequency band to carry out wireless communication by a time division method and a second communication apparatus that uses a second frequency band that is adjacent to the first frequency band to carry out wireless communication by a time division method, to execute:

a first communication procedure of using the first frequency band to carry out wireless communication by a time division method with the first communication apparatus;

a second communication procedure of using the second frequency band to carry out wireless communication by a time division method with the second communication apparatus simultaneously with the first communication procedure; and a control procedure of causing each of the transmission intervals and reception intervals of data in the second communication procedure to coincide with each of the transmission intervals and reception intervals of data that are partitioned by time divisions in the first communication procedure.

Effect of the Invention

In the router apparatus of the present invention, a first communication unit uses a first frequency band to carry out wireless communication by a time division method with a first communication apparatus; and simultaneously, a second communication unit uses a second frequency band that is adjacent to the first frequency band to carry out wireless communication by a time division method with a second communication apparatus; and a control unit causes each of the transmission intervals and reception intervals of data in the second communication unit to coincide with each of the transmission intervals and reception intervals of data that are partitioned by time divisions in the first communication unit.

In the router apparatus of the present invention, the transmission timing of data to the first communication apparatus does not coincide with the reception timing of data from the second communication apparatus, whereby transmission waves when transmitting data to the first communication apparatus do not become interference waves of data that are received from the second communication apparatus. In addition, the transmission timing of data to the second communication apparatus and the reception timing of data from the first communication apparatus do not coincide, whereby the transmission waves when transmitting data to the second communication apparatus do not become interference waves of data that are received from the first communication apparatus. As a result, the present invention has the effect of enabling maintenance of the communication quality with the first and second communication apparatuses.

BEST MODE FOR CARRYING OUT THE INVENTION

The best mode of carrying out the present invention is next described with reference to the accompanying drawings.

In the present exemplary embodiment, a case is described by way of example in which a router apparatus is a wireless LAN router provided with WiMAX communication capabilities for simultaneously carrying out wireless LAN communication and WiMAX communication.

Figure 1:
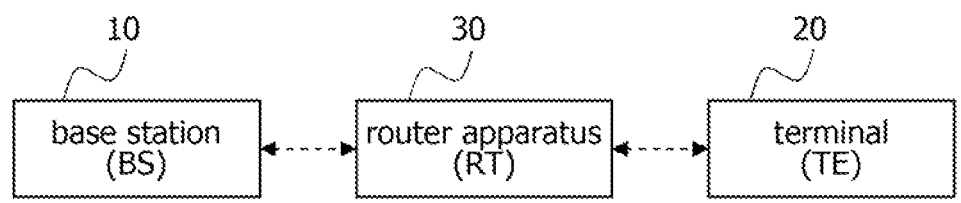
FIG. 1 is a block diagram showing the configuration of the wireless communication system of the first exemplary embodiment of the present invention.

As shown in FIG. 1, the wireless communication system of the present exemplary embodiment includes WiMAX base station (hereinbelow referred to as "BS") 10, wireless LAN terminal (hereinbelow referred to as "TE") 20, and router apparatus (hereinbelow referred to as "RT") 30 that is a wireless LAN router provided with WiMAX communication capabilities. In the interest of simplifying the explanation, only one of each of BS10 and TE20 are shown as BS and TE in FIG. 1.

In WiMAX communication, data are contained in subframes and communicated, and a TDD (Time Division Duplex) method is used as the communication method. The TDD method is a method in which the same frequency is used in uplink and downlink, and uplink subframes and downlink subframes are switched on the time axis.

As a result, transmission intervals and reception intervals of subframes (data) are partitioned by time division, and BS 10 transmits downlink subframes that contain data to RT 30 in transmission intervals and receives uplink subframes that contain data from RT 30 in reception intervals. BS 10 can use a known apparatus that is provided with the above-described capabilities and detailed explanation is therefore here omitted.

In wireless LAN, on the other hand, the transmission intervals and reception intervals of subframes (data) are partitioned by time division, and RT 30 transmits downlink subframes that contain data to TE 20 in transmission intervals and receives uplink subframes that contain data from TE 20 in reception intervals.

However, to avoid the collision of data, the transmission of messages such as RTS (Request To Send), CTS (Clear To Send) and ACK (Acknowledgement) are prescribed before and after data transmission.

As a result, when there are data to transmit to RT 30, TE 20 first transmits to RT 30 an RTS message, which is a transmission request message indicating a request to transmit data, and upon receiving from RT 30 a CTS message, which is a reception preparation completion message indicating that preparation to receive data is complete, begins transmitting frames that contain data. TE 20 further receives from RT 30 an ACK message, which is a reception completion report message indicating that the reception of data is complete. TE 20 can use a known device provided with the above-described capabilities, and detailed explanation is therefore here omitted.

Figure 2:
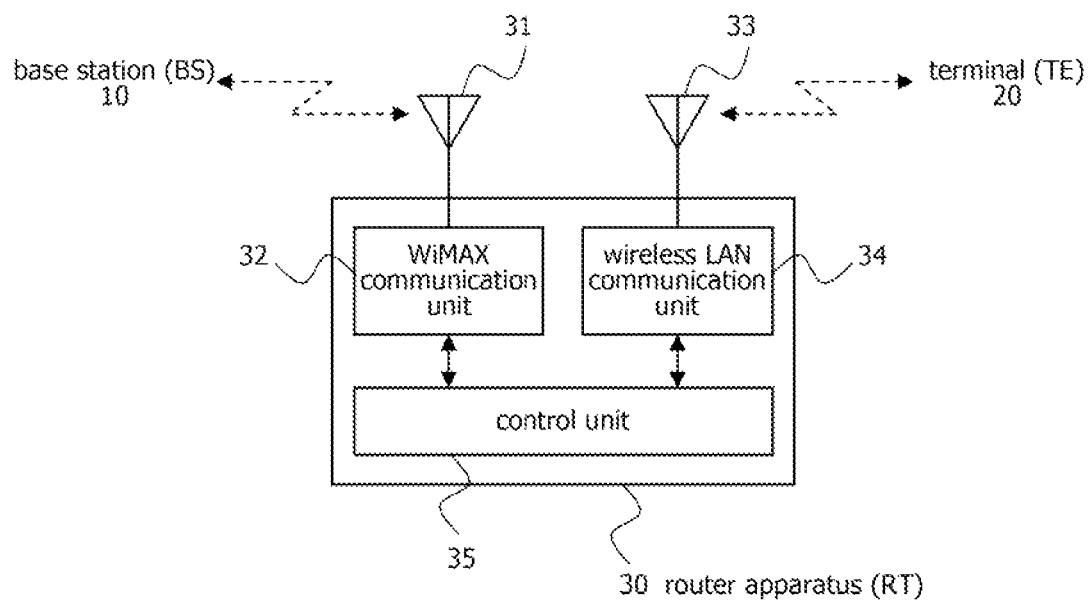
FIG. 2 is a block diagram showing the configuration of the router apparatus shown in FIG. 1.

As shown in FIG. 2, RT 30 includes WiMAX antenna 31, WiMAX communication unit 32, wireless LAN antenna 33, wireless LAN communication unit 34, and control unit 35; and relays data that are wirelessly communicated in BS 10 and TE 20.

Transmission intervals and reception intervals of subframes (data) are partitioned by time division, and WiMAX communication unit 32 transmits to BS 10 uplink subframes that contain data in transmission intervals and receives downlink subframes from BS 10 that contain data in reception intervals. These transmission intervals and reception intervals are assumed to be instructed by control unit 35.

Upon receiving an RTS message from TE 20, wireless LAN communication unit 34 transmits a CTS message to TE 20 at the timing instructed from control unit 35, and then receives frames containing data from TE 20. Upon completing reception of frames from TE 20, wireless LAN communication unit 34 transmits an ACK message to TE 20 at the timing instructed from control unit 35.

When there are data to be transmitted to TE 20, wireless LAN communication unit 34 transmits frames containing the data to TE 20 at the same timing as transmission intervals in WiMAX communication unit 32 that are instructed from control unit 35.

Figure 3:
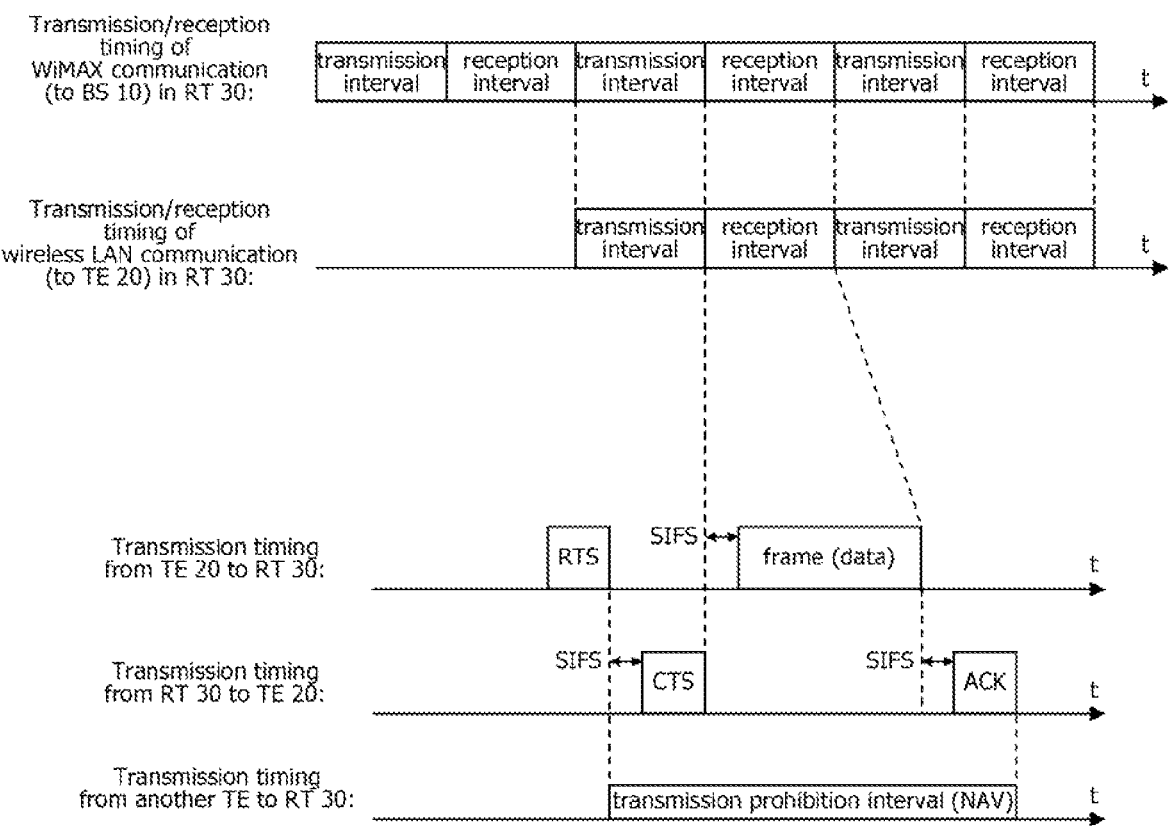
FIG. 3 is a timing chart for describing the operations of the wireless communication system shown in FIG. 1.

As shown in FIG. 3, control unit 35 causes each of the transmission intervals and reception intervals of data in wireless LAN communication unit 34 to coincide with the transmission intervals and reception intervals of data that have been partitioned by time division in WiMAX communication unit 32.

More specifically, regarding transmission intervals in wireless LAN communication unit 34, control unit 35 instructs wireless LAN communication unit 34 to transmit a frame containing data matched with the start of the next transmission interval in WiMAX communication unit 32.

In this way, the start timings of transmission intervals substantially coincide in WiMAX communication unit 32 and wireless LAN communication unit 34.

On the other hand, regarding reception intervals in wireless LAN communication unit 34, control unit 35 instructs wireless LAN communication unit 34 to transmit a CTS message matched with the start of the next reception interval in WiMAX communication unit 32.

In this way, the reception of a frame that contains data from TE 20 is started matched with the start of the next reception interval in WiMAX communication unit 32, whereby the start timings of reception intervals substantially coincide in WiMAX communication unit 32 and wireless LAN communication unit 34.

The operations of the wireless communication system of the present exemplary embodiment are next described concretely using FIG. 3.

As shown in FIG. 3, when there are data to transmit to RT 30, TE 20 transmits an RTS message to RT 30.

Control unit 35 of RT 30 determines that the data will be received from TE 20 in the next reception interval in WiMAX communication unit 32, waits for the passage of an SIFS (Short Inter-Frame Space) after the completion of reception of the RTS message, and transmits a CTS message to TE 20 from wireless LAN communication unit 34 matched with the start of the next reception interval in WiMAX communication unit 32.

TE 20, having received this message, waits for the passage of an SIFS from the completion of the reception of the CTS message and begins transmission of frames that contain data to RT 30.

In this way, the start of reception intervals in WiMAX communication unit 32 and wireless LAN communication unit 34 substantially coincides in RT 30.

At this time, even if control unit 35 of RT 30 should receive an RTS message from another TE during the interval following reception of an RTS message from TE 20 until the completion of transmission of an ACK message to TE 20, control unit 35 will not transmit a CTS message to the other TE. As a result, this interval is a data-transmission-prohibited interval (NAV: Network Allocation Vector) for other TE.

Upon completion of the reception of frames from TE 20 in the reception interval, control unit 35 of RT 30 transmits an ACK message to TE 20 from wireless LAN communication unit 34.

When there are data to transmit to TE 20, control unit 35 of RT 30 next determines that the data will be transmitted to TE 20 in the next transmission interval in WiMAX communication unit 32 and begins the transmission of frames that contain the data to TE 20 from wireless LAN communication unit 34 matched with the start of the next transmission interval.

In this way, the timings of the start of transmission intervals in WiMAX communication unit 32 and wireless LAN communication unit 34 substantially coincide in RT 30.

In the present exemplary embodiment as described hereinabove, RT 30 causes the transmission intervals and reception intervals of data in wireless LAN communication unit 34 to coincide with the transmission intervals and reception intervals of data that are partitioned by time division in WiMAX communication unit 32.

Accordingly, the timing of the transmission of data to BS 10 does not coincide with the timing of the reception of data from TE 20 in RT 30, and transmission waves when transmitting data to BS 10 therefore do not become interference waves of data received from TE 20, and the communication quality of wireless LAN can be maintained. In addition, because the transmission timing of data to TE 20 and the reception timing of data from BS 10 do not coincide, the transmission waves when transmitting data to TE 20 do not become interference waves of data received from BS 10, and the communication quality of WiMAX can be maintained.

Although the present invention has been described hereinabove with reference to an exemplary embodiment, the present invention is not limited to the above-described exemplary embodiment. The constitution and details of the present invention are open to various modifications within the scope of the present invention that will be clear to anyone of ordinary skill in the art.

For example, although a case has been described by way of example in which RT 30 is a wireless LAN router provided with WiMAX communication capabilities, the present invention is not limited to this form. For example, the present invention can be generally applied to cases in which RT 30 is a router apparatus that simultaneously carries out wireless communication by a plurality of communication methods that each use adjacent frequency bands by a time division method.

In addition, although an example has been described in which the reception of all frames from TE 20 is completed within a reception interval in RT 30, a case can be considered in which the reception of frames is not completed despite the passage of a reception interval. However, in this case as well, transmission waves to BS 10 do not become interference waves of received data from TE 20 in at least that reception interval, and this is sufficient as the effect of the present invention.

In addition, the method that is carried out in RT 30 of the present invention may be applied to a program for causing execution by a computer. This program can be stored in a recording medium or can be provided to the outside by way of a network.

What is claimed is:

1. A wireless communication system that includes a first communication apparatus that uses a first frequency band to carry out wireless communication by a time division method; a second communication apparatus that uses a second frequency band that is adjacent to said first frequency band to carry out wireless communication by a time division method; and a router apparatus that relays data that are communicated wirelessly in said first communication apparatus and said second communication apparatus; wherein said router apparatus comprises:
 a first communication unit that uses said first frequency band to carry out wireless communication by a time division method with said first communication apparatus;
 a second communication unit that uses said second frequency band to carry out wireless communication by a time division method with said second communication apparatus simultaneously with wireless communication by means of said first communication unit; and
 a control unit that causes each of the transmission intervals and reception intervals of data in said second communication unit to coincide with each of the transmission intervals and reception intervals of data that have been partitioned into time divisions in said first communication unit.

2. The wireless communication system as set forth in claim 1, wherein said control unit, upon reception by said second communication unit of a transmission request message from said second communication apparatus requesting transmission of data, matches with the start of the next reception interval in said first communication unit, and transmits from said second communication unit to said second communication apparatus a reception preparation completion message indicating that preparation for reception of data has been completed.

3. The wireless communication system as set forth in claim 2, wherein said control unit, having received said transmission request message from said second communication apparatus, despite receiving said transmission request message from another second communication apparatus, does not transmit said reception preparation completion message to the other second communication apparatus during the subsequent interval until completion of transmission to said second communication apparatus of a reception completion notification message indicating that reception of data has been completed.

4. The wireless communication system as set forth in claim 1, wherein: said first communication apparatus is a communication apparatus for WiMAX communication that uses a TDD (Time Division Duplex) method; and said second communication apparatus is a communication apparatus for wireless LAN communication.

5. A router apparatus that relays data that are wirelessly communicated in a first communication apparatus that uses a first frequency band to carry out wireless communication by a time division method and a second communication apparatus that uses a second frequency band that is adjacent to said first frequency band to carry out wireless communication by a time division method; said router apparatus comprising:
 a first communication unit that uses said first frequency band to carry out wireless communication by a time division method with said first communication apparatus;
 a second communication unit that uses said second frequency band to carry out wireless communication by a time division method with said second communication apparatus simultaneously with wireless communication by said first communication unit; and
 a control unit that causes each of the transmission intervals and reception intervals of data in said second communication unit to coincide with each of the transmission intervals and reception intervals of data that have been partitioned by time divisions in said first communication unit.

6. The router apparatus as set forth in claim 5, wherein said control unit, upon reception by said second communication unit of a transmission request message from said second communication apparatus requesting transmission of data, matches with the start of the next reception interval in said first communication unit, and transmits from said second communication unit to said second communication apparatus a reception preparation completion message indicating that preparation for reception of data has been completed.

7. The router apparatus as set forth in claim 6, wherein said control unit, having received said transmission request message from said second communication apparatus, despite receiving said transmission request message from another second communication apparatus, does not transmit said reception preparation completion message to the other second communication apparatus during the subsequent interval until completion of transmission to said second communication apparatus of a reception completion notification message indicating that reception of data has been completed.

8. The router apparatus as set forth in claim 5, wherein: said first communication apparatus is a communication apparatus for WiMAX communication that uses a TDD method; and said second communication apparatus is a communication apparatus for wireless LAN communication.

9. A wireless communication method that is realized by a router apparatus that relays data that are wirelessly communicated in a first communication apparatus that uses a first frequency band to carry out wireless communication by a time division method and a second communication apparatus that uses a second frequency band that is adjacent to said first frequency band to carry out wireless communication by a time division method, said wireless communication method comprising:
 a first communication step of using said first frequency band to carry out wireless communication by a time division method with said first communication apparatus;
 a second communication step of using said second frequency band to carry out wireless communication by a time division method with said second communication apparatus simultaneously with said first communication step; and
 a control step of causing each of the transmission intervals and reception intervals of data in said second communication step to coincide with each of the transmission intervals and reception intervals of data that are partitioned by time divisions in said first communication step.

10. The wireless communication method as set froth in claim 9, wherein, in said control step, upon reception of a transmission request message from said second communication apparatus requesting transmission of data, a reception preparation completion message indicating that preparation for reception of data has been completed is transmitted to said second communication apparatus matched with the start of the next reception interval in said first communication step.

11. The wireless communication method as set forth in claim 10, wherein, in said control step, when said transmission request message is received from said second communication apparatus, despite reception of said transmission request message from another second communication apparatus, said reception preparation completion message is not transmitted to the other second communication apparatus during the subsequent interval until the completion of transmission to said second communication apparatus of a reception completion notification message indicating that reception of data has been completed.

12. The wireless communication method as set forth in claim 9, wherein: said first communication apparatus is a communication apparatus for WiMAX communication that uses a TDD method; and said second communication apparatus is a communication apparatus for wireless LAN communication.

* * * * *